(12) United States Patent
Lefebvre et al.

(10) Patent No.: US 7,817,161 B2
(45) Date of Patent: Oct. 19, 2010

(54) TEXTURE SYNTHESIS USING DIMENSIONALITY-REDUCED APPEARANCE SPACE

(75) Inventors: Sylvain Lefebvre, La Fouillouse (FR); Hugues H. Hoppe, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 578 days.

(21) Appl. No.: 11/426,564

(22) Filed: Jun. 26, 2006

(65) Prior Publication Data
US 2007/0296730 A1     Dec. 27, 2007

(51) Int. Cl.
*G09G 5/00* (2006.01)
(52) U.S. Cl. .................................... 345/582
(58) Field of Classification Search ............. 345/582
See application file for complete search history.

(56) References Cited

U.S. PATENT DOCUMENTS

| | | | |
|---|---|---|---|
| 5,097,427 A | 3/1992 | Lathrop et al. |
| 5,388,517 A | 2/1995 | Levien |
| 5,459,586 A | 10/1995 | Nagasato et al. |
| 5,471,572 A | 11/1995 | Buchner et al. |
| 5,680,528 A | 10/1997 | Korszun |
| 5,740,277 A | 4/1998 | Katto |
| 5,774,129 A | 6/1998 | Poggio et al. |
| 5,784,498 A | 7/1998 | Venable |
| 5,872,867 A | 2/1999 | Bergen |
| 5,974,198 A | 10/1999 | Hamburg et al. |
| 6,075,905 A | 6/2000 | Herman et al. |
| 6,185,342 B1 | 2/2001 | Hamburg et al. |
| 6,392,655 B1 | 5/2002 | Migdal |
| 6,525,744 B1 | 2/2003 | Poggio et al. |
| 6,593,933 B1 | 7/2003 | Xu |

(Continued)

FOREIGN PATENT DOCUMENTS

JP     9044655     2/1997

(Continued)

OTHER PUBLICATIONS

Nealen, Andrew and Alexa, Marc, "Fast and High Quality Overlap Repair for Patch-Based Texture Synthesis," 2004, Computer Graphics International 2004, pp. 582-585.*

(Continued)

*Primary Examiner*—Ryan R. Yang
(74) *Attorney, Agent, or Firm*—Lyon & Harr, L.L.P.; Craig S. Fischer (57) ABSTRACT

A dimensionality-reduced appearance space system and method that transforms an exemplar image from a traditional three-dimensional space of pixel colors to a low-dimensional Euclidean space of appearance vectors. The transformation of an exemplar is a preprocessing step, and the transformed exemplar becomes the starting point for high-quality texture synthesis. The exemplar transformation begins by computing a high-dimensional appearance vector using one or a combination of several attribute channels. These attribute channels provide additional information to further distinguish exemplar pixels from each other. These attribute channels includes spatial pixel neighborhoods, feature distance, and radiance transfer information. Dimensionality reduction is applied to the resulting high-dimensional appearance vector to generate the transformed exemplar in low-dimensional Euclidean appearance space. Because much of the information contained in the high-dimensional appearance vector is redundant or coherent, dimensionality reduction can be applied to drastically reduce the dimensionality of the appearance vector with little loss of information.

19 Claims, 9 Drawing Sheets

U.S. PATENT DOCUMENTS

| | | | |
|---|---|---|---|
| 6,700,585 | B2 | 3/2004 | Ritter |
| 6,762,769 | B2 | 7/2004 | Guo |
| 6,888,544 | B2 | 5/2005 | Malzbender et al. |
| 6,965,694 | B2 | 11/2005 | Ueda et al. |
| 6,999,095 | B2 | 2/2006 | Wang et al. |
| 7,002,591 | B1 | 2/2006 | Leather et al. |
| 7,034,841 | B1 | 4/2006 | Weiblen et al. |
| 7,088,375 | B1 | 8/2006 | Hamburg |
| 7,324,116 | B2 * | 1/2008 | Boyd et al. ................ 345/582 |
| 2002/0122043 | A1 | 9/2002 | Freeman |
| 2002/0158888 | A1 | 10/2002 | Kitsutaka |
| 2002/0171660 | A1 | 11/2002 | Luo |
| 2003/0164838 | A1 | 9/2003 | Guo |
| 2003/0179923 | A1 | 9/2003 | Xiong |
| 2003/0189579 | A1 | 10/2003 | Pope |
| 2003/0206176 | A1 | 11/2003 | Ritter |
| 2004/0075666 | A1 | 4/2004 | Ritter |
| 2004/0096120 | A1 | 5/2004 | Tong |
| 2004/0155887 | A1 | 8/2004 | Kitsutaka |
| 2004/0165787 | A1 | 8/2004 | Perez et al. |
| 2004/0233211 | A1 | 11/2004 | Wang |
| 2004/0234159 | A1 | 11/2004 | Wang |
| 2005/0007378 | A1 | 1/2005 | Grove |
| 2005/0013509 | A1 | 1/2005 | Samadani |
| 2005/0231519 | A1 | 10/2005 | Solanki et al. |
| 2005/0253863 | A1 | 11/2005 | Mitchell et al. |
| 2006/0001679 | A1 | 1/2006 | Hamburg |
| 2006/0028481 | A1 | 2/2006 | Zhang et al. |

FOREIGN PATENT DOCUMENTS

| | | |
|---|---|---|
| WO | WO2004055724 | 7/2004 |

OTHER PUBLICATIONS

Ashikhmin, M., "Synthesizing Natural Textures" in proceedings of *2001 ACM Symposium on Interactive 3D Graphics*, Research Triangle Park, North Carolina Mar. 19-21, pp. 217-226.

De Bonet, J., "Multiresolution sampling procedure for analysis and synthesis of texture images" in *ACM SIGGRAPH*, 1997, pp. 361-368.

Garber, D., *Computational Models for Texture Analysis and Texture Synthesis*. PhD thesis, University of Southern California, 1981.

Efros, A., and Leung, T., "Texture synthesis by non-parametric sampling" in *ICCV*, 1999, pp. 1033-1038.

Hertzmann, A., Jacobs, C., Oliver, N., Curless, B., and Salesin, D., "Image analogies" in *ACM SIGGRAPH*, 2001, pp. 327-340.

Hertzmann, A., and Zorin, D., "Illustrating smooth surfaces" in *ACM SIGGRAPH*, 2000, pp. 517-526.

Kwatra, V., Schödl, A., Essa, I., Turk, G., and Bobick, A., "Graphcut textures: image and video synthesis using graph cuts", in *ACM SIGGRAPH*, 2003, pp. 277-286.

Kwatra, V., Essa, I., Bobick, A., and Kwatra, N., "Texture optimization for example-based synthesis", in *ACM SIGGRAPH*, 2005, pp. 795-802.

Lai, Y.-K., Hu, S.-M., Gu, D., and Martin, R., "Geometric texture synthesis and transfer via geometry images" in *Proc. of SMA*, 2005, pp. 15-26.

Lefebvre, S., and Hoppe, H., "Parallel controllable texture synthesis" in *ACM SIGGRAPH*, 2005, pp. 777-786.

Leung, T., and Malik, J., "Representing and recognizing the visual appearance of materials using three-dimensional textons", in *IJCV* 43(1) 2001, pp. 29-44.

Magda, S., and Kriegman, D., "Fast texture synthesis on arbitrary meshes", in *Eurographics Symposium on Rendering*, 2003, pp. 82-89.

Malik, J., Belongie, S., Shi, J., and Leung, T., "Textons, contours and regions: Cue integration in image segmentation", in *ICCV*, 1999, pp. 918-925.

Neyret, F., and Cani, M.-P., "Pattern-based texturing revisited" in *ACM SIGGRAPH*, 1999, pp. 235-242.

Neyret, F., "Advected textures", in *Symposium on computer animation*, 2003, pp. 147-153.

Popat, K., and Picard, R., "Novel cluster-based probability model for texture synthesis, classification, and compression" in *Visual Communications and Image Processing*, 1993, pp. 756-768.

Praun, E., Finkelstein, A., and Hoppe, H., "Lapped textures" in *ACM SIGGRAPH*, 2000, pp. 465-470.

Roweis, S., EM algorithms for PCA and SPCA, in *NIPS*, 1997, pp. 626-632.

Roweis, S., and Saul, L... "Nonlinear dimensionality reduction by locally linear embedding" in *Science*, 2000, 290:2323-2326.

Sloan, P.-P., Liu, X., Shum, H.-Y., and Snyder, J., "Bi-scale radiance transfer", in *ACM SIGGRAPH*, 2003, pp. 370-375.

Soler, C., Cani, M.-P., and Angelidis, A., "Hierarchical pattern mapping" in *ACM SIGGRAPH*, 2002, pp. 673-680.

Tenenbaum, J., de Silva, V., and Langford, J., "A global geometric framework for nonlinear dimensionality reduction" in *Science*, 2000, 290:2319-2323.

Tong, X., Zhang, J., Liu, L., Wang, X., Guo, B., and Shum, H.-Y., "Synthesis of bidirectional texture functions on arbitrary surfaces", in *ACM SIGGRAPH*, 2002, pp. 665-672.

Turk, G., "Texture synthesis on surfaces", in *ACM SIGGRAPH*, 2001, pp. 347-354.

Wei, L.-Y., and Levoy, M., "Fast texture synthesis using tree-structured vector quantization" in *ACM SIGGRAPH*, 2000, pp. 479-488.

Wei, L.-Y., and Levoy, M., "Texture synthesis over arbitrary manifold surfaces" in *ACM SIGGRAPH*, 2001, pp. 355-360.

Wei, L.-Y., and Levoy, M., "Order-independent texture synthesis", 2003, at http://graphics.stanford.edu/papers/texture-synthesis-sig03/. (Earlier version is Stanford University Computer Science TR-2002-01.).

Wu, Q., and Yu, Y., "Feature matching and deformation for texture synthesis" in *ACM SIGGRAPH*, 2004, pp. 362-365.

Ying, L., Hertzmann, A., Biermann, H., and Zorin, D., "Texture and shape synthesis on surfaces" in *Eurographics Workshop on Rendering*, 2001, pp. 301-312.

Zhang, J., Zhou, K., Velho, L., Guo, B., and Shum, H.-Y., "Synthesis of progressively-variant textures on arbitrary surfaces" in *ACM SIGGRAPH*, 2003, pp. 295-302.

Cula, O.G. and Dana, K.J., "Recognition Methods for 3D Textured Surfaces", available at http://www.ece.rutgers.edu/~kdana/research/spie01.pdf.

Gralewski, L., et al., "Statistical Synthesis of Facial Expressions for the Portrayal of Emotion" available at http://delivery.acm.org/10.1145/990000/988867/p190-gralewski.pdf?key1=988867&key2=9951194411&coll=GUIDE&dl=GUID E&CFID=69372413&CFTOKEN=85977336.

Fatahalian, K., "Real-Time Global Illumination of Deformable Objects", available at: http://graphics.stanford.edu/~kayvonf/papers/seniorthesis03.pdf.

Adelson, E. H., C. H. Anderson, J. R. Bergen, P. J. Burt and J. M. Ogden, Pyramid methods in image processing, RCA Engineer, Nov./Dec. 1984, pp. 33-41, vol. 29, No. 6.

Bar-Joseph, Z., R. El-Yaniv, D. Lischinski, and M. Werman, Texture mixing and texture movie synthesis using statistical learning, IEEE TVCG, 2001, vol. 7 No. 2, pp. 120-135.

Burt, P. J., E. Adelson, The Laplacian Pyramid as a compact image code, IEEE Transactions on Communications, Apr. 1983, vol. com-31 No. 4, pp. 532-540.

Cohen, M., J. Shade, S. Hiller, and O. Deussen, 2003, Wang tiles for image and texture generation, ACM SIGGRAPH, pp. 287-294.

Lefebvre, S., and F. Neyret, Pattern based procedural textures, Symposium and Interactive 3D Graphics, 2003, pp. 203-212.

Liang, L., C. Liu, Y. Xu, B. Guo, and H.-Y. Shum, Real-time texture synthesis by patch-based sampling, 2001, ACM TOG, vol. 20, No. 3, 127-150.

Liu, Y., W.-C. Lin, and J. Hays, Near-regular texture analysis and manipulation, ACM SIGGRAPH, 2004, pp. 368-376.

Liu, Y., Y. Tsin, and W.-C. Lin, The promise and peril of near-regular texture, IJCV, vol. 62, No. 1-2, pp. 149-159.

Tanner, C., C. Migdal, and M. Jones, The clipmap: A virtual mipmap, ACM SIGGRAPH, 1998, pp. 151-158.

Tonietto, L., and M. Walter, Towards local control for image-based texture synthesis, Proceedings of the 15th Brazilian Symposium on Comp. Graphics and Image Processing SIBGRAPHI, 2002, pp. 252-258.

Turk, G., Generating textures on arbitrary surfaces using reaction-diffusion, Proceedings of the 18th Annual Conf. on Comp. Graphics and Interactive Techniques, 1991, pp. 289-298.

Wang, L., X. Gu, K. Mueller and S.-T. Yau, Uniform texture synthesis and texture mapping using global parameterization, J. The Visual Comp., pp. 801-810.

Wei, L.-Y., Tile-based texture mapping on graphics hardware, Graphics Hardware. 2004, pp. 55-64.

Zalesny, A., V. Ferrari, G. Caenen, and L. Van Gool, Composite texture synthesis, IJCV, 2005, vol. 62, No. 1-2, pp. 161-176.

Co-pending U.S. Appl. No. 11/171,920, Multi-level image stack of filtered images, filed Jun. 30, 2005.

Co-pending U.S. Appl. No. 11/171,923, Magnification of indirection textures, filed Jun. 30, 2005.

Co-pending U.S. Appl. No. 11/174,231, Parallel texture synthesis by unsampling pixel coordinates, filed Jun. 30, 2005.

Co-pending U.S. Appl. No. 11/428,355, Synthesis of advecting texture using adaptive regeneration, filed Jun. 30, 2006.

Co-pending U.S. Appl. No. 11/428,311, Anisometric texture synthesis, filed Jun. 26, 2006.

Co-pending U.S. Appl. No. 11/172,593, Parallel texture synthesis having controllable jitter, filed Jun. 30, 2005.

Co-pending U.S. Appl. No. 11/172,594, Sub-pass correction using neighborhood matching, filed Jun. 30, 2005.

Aaron M. Guertin, Office Action, U.S. Appl. No. 11/172,593, Mailed Sep. 13, 2007.

Aaron M. Guertin, Office Action, U.S. Appl. No. 11/172,594, Mailed Oct. 15, 2007.

Stephen R. Koziol, Office Action, U.S. Appl. No. 11/171,920, Mailed Sep. 19, 2007.

Wesner Sajous, Office Action. U.S. Appl. No. 11/171,923, Mailed Aug. 24, 2007.

* cited by examiner

TEXTURE SYNTHESIS USING DIMENSIONALITY-REDUCED APPEARANCE SPACE

BACKGROUND

Texture synthesis involves automatically generating large textures from a small example image (known as a texture sample or exemplar). This exemplar-based texture synthesis takes an exemplar and generates additional content based on that exemplar to create much more content than is contained in the exemplar. Exemplar-based texture synthesis alleviates the need to store explicitly an entire expanse of content. Instead, the content is generated "on the fly" from the much smaller exemplar.

Traditionally, exemplar-based texture synthesis includes a correction process that compares neighborhoods of each synthesized pixel with neighborhoods of the exemplar. The synthesized pixels then are modified to recreate synthesized neighborhoods that are compatible with the exemplar content. For each pixel, the best matching neighborhood is found, and then the current pixel is replaced with the best-matching pixel. The best-matching neighborhood is determined by comparing pixel colors in a small grid of pixels. For example, for each pixel, a 5×5 neighborhood of pixels may be examined, and the error of the neighborhood is the sum of the errors of the red, green, and blue (RGB) color vectors of individual pixels in the 5×5 neighborhood. The major problem with this traditional approach is that to properly recover the structure of the texture and ensure good matching, a fairly broad neighborhood must be examined to determine where in the "big picture" of the synthesized texture the pixel neighborhood being processed is located.

One way to mitigate this problem is to extract more information from the exemplar pixels than just their RGB color values. For example, some texture synthesis techniques transform the exemplar into a higher-dimensional space to characterize more information at each pixel than just the color. While traditional color space is three-dimensional (3-D) containing the RGB color values of a pixel, a higher-dimensional appearance space may contain additional attribute channels (and more dimensions) having additional information in addition to the RGB information. This additional information helps further distinguish the pixel from its neighbors. This additional information manifests itself in a transformed exemplar that has a higher-dimensional space than the traditional 3-D color space.

One type of texture synthesis technique that uses this transformed exemplar having a higher-dimensional appearance space is texton-based texture synthesis. In general, texton-based texture synthesis builds a higher-dimensional (more than 3-D) vector containing filter responses, clusters the pixels into textons in an appearance space, and uses a matrix to record and look up distances between textons. More specifically, the texton-based texture synthesis applies a sequence of steerable filters (or Gaussian derivative filters) to a pixel neighborhood to obtain a vector of filter responses. These are responses to filters at a series of different scales around the pixel, such as, for example, 3×3, 5×5, 7×7, etc. neighborhoods. Based on these filter-response vectors, pixels having similar appearance are clustered into groups (called "textons"), wherein each cluster is a set of pixels having similar filter responses. A matrix, called an inter-texton distance matrix, then is generated that contains the pre-computed distances between each of the textons. Each entry of the inter-texton distance matrix computes a difference between one texton and another. Thus, if two textons are similar, the matrix entry for those textons is a small value, and if they are different the entry is a large value.

There are at least two drawbacks, however, to texton-based texture synthesis. First, the clustering process introduces errors into the texture synthesis process. In particular, clustering process treats all pixels in the same cluster as being identical, even if their neighborhoods are not completely similar. Because of this, the texton representing a current pixel is only an approximation of the appearance of the original exemplar pixel. This approximation introduces errors into the synthesis process and degrades synthesis quality.

A second drawback to the texton-based texture synthesis is that distances in the appearance space obtained after exemplar transformation are expensive to compute because the space has many dimensions. This leads to inefficient processing. Texton-based texture synthesis techniques typically require the pre-computation and storage of a large inter-texton distance matrix. The inter-texton distance matrix is used to perform an explicit look-up in order to determine the distance between textons. Storing the inter-texton distance matrix may use a great deal of memory, since the inter-texton distance matrix can be quite large. Moreover, making random accesses to memory to perform look-ups also is memory inefficient.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The dimensionality-reduced appearance space system and method disclosed herein includes transforming an exemplar image from a traditional three-dimensional space of pixel colors to a low-dimensional Euclidean space of appearance vectors. Once this transformation is completed, texture synthesis then can be performed in this transformed space.

The exemplar transformation begins by computing a high-dimensional appearance vector for each exemplar pixel using the pixel color values and one or more additional attribute channels. Using this high-dimensional appearance vector, a transformed exemplar in high-dimensional appearance space is generated. Because much of the information contained in the high-dimensional appearance vector is redundant or coherent, dimensionality reduction can be applied to drastically reduce the dimensionality of the appearance vector with little loss of information. One of several types of dimensionality reduction techniques is applied to the transformed exemplar to obtain a dimensionality-reduced transformed exemplar in low-dimensional Euclidean appearance space. This transformed exemplar is the starting point for high-quality texture synthesis.

The traditional approach in texture synthesis is to compare color neighborhoods with those of an exemplar. However, synthesis quality is greatly improved if pointwise colors are replaced by appearance vectors that incorporate spatial and feature information. The additional information encoded in the one or more additional attribute channels includes: (1) spatial pixel neighborhood information; (2) feature distance information; and (3) radiance transfer information. Because the dimensionality-reduced appearance space system and method is a preprocess, incorporating the neighborhood, feature, and radiance-transfer information has little cost. In addition, the dimensionality reduction encodes all the information concisely using exemplar-adapted basis functions, rather than generic steerable filters. This results in better quality texture synthesis.

It should be noted that alternative embodiments are possible, and that steps and elements discussed herein may be changed, added, or eliminated, depending on the particular embodiment. These alternative embodiments include alternative steps and alternative elements that may be used, and structural changes that may be made, without departing from the scope of the invention.

DRAWINGS DESCRIPTION

Referring now to the drawings in which like reference numbers represent corresponding parts throughout.

DETAILED DESCRIPTION

In the following description of the dimensionality-reduced appearance space method and system, reference is made to the accompanying drawings, which form a part thereof, and in which is shown by way of illustration a specific example whereby the dimensionality-reduced appearance space method and system may be practiced. It is to be understood that other embodiments may be utilized and structural changes may be made without departing from the scope of the claimed subject matter.

I. System Overview

The dimensionality-reduced appearance space system and method is designed to be used prior to performing texture synthesis. In other words, the dimensionality-reduced appearance space system and method is a preprocessing step that is performed before runtime. Once the exemplar has been preprocessed by the dimensionality-reduced appearance space system and method, the resultant transformed exemplar is used as input for a texture synthesis technique.

Figure 1:
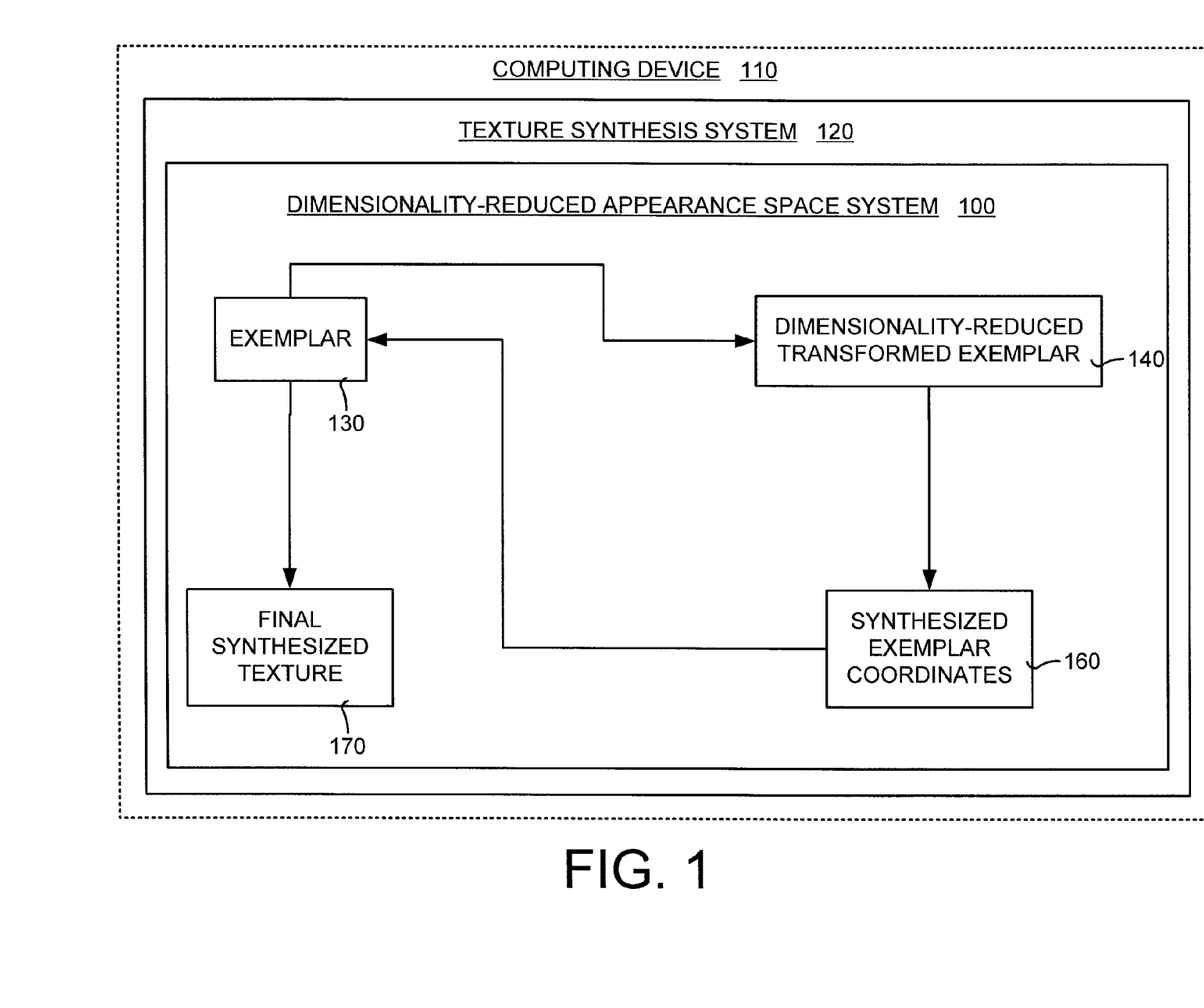
FIG. 1 is a block diagram illustrating an exemplary implementation of the dimensionality-reduced appearance space system disclosed herein implemented into a texture synthesis system.

FIG. 1 is a block diagram illustrating an exemplary implementation of the dimensionality-reduced appearance space system disclosed herein implemented into a texture synthesis system. It should be noted that FIG. 1 is merely one of several ways in which the dimensionality-reduced appearance space system may be implemented and used. The dimensionality-reduced appearance space system may also be implemented on other types of processing systems, such as on a central processing unit (CPU) or multi-core processing systems.

Referring to FIG. 1, the dimensionality-reduced appearance space system 100 is designed to run on a computing device 110 (shown by a dotted line). It should be noted that the dimensionality-reduced appearance space system 100 may be run on numerous types of general purpose or special purpose computing system environments or configurations, including personal computers, server computers, hand-held, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like. The computing device 110 is merely meant to represent any one of these and other types of computing system environments or configurations.

As shown in FIG. 1, the dimensionality-reduced appearance space system 100 is part of a texture synthesis system 120 running on the computing device 110. The texture synthesis system 120 is able to create new textures with the same visual appearance as a given sample image or exemplar 130. The exemplar is part of the dimensionality-reduced appearance space system 100. The dimensionality-reduced appearance space system 100 processes and transforms the exemplar 130 into a dimensionality-reduced transformed exemplar 140.

Instead of using the exemplar 130 as input for the texture synthesis module 150, the dimensionality-reduced transformed exemplar 140 is the starting place for texture synthesis. Using the dimensionality-reduced transformed exemplar 140, texture coordinates are synthesized to obtain an image of synthesized exemplar coordinates 160 (or synthesized index map). Each pixel of the synthesized exemplar coordinates 160 contains a coordinate of the exemplar image 130. The coordinates at each pixel of the synthesized exemplar coordinates 160 are used to access the exemplar 130 (rather than the dimensionality-reduced transformed exemplar 140) and retrieve a color. This process forms a final synthesized texture 170. In this manner, the final synthesized texture (170) can be produced at runtime using the dimensionality-reduced transformed exemplar 140 as a starting point. Using the dimensionality-reduced appearance space system 100 to preprocess the exemplar 130 produces texture synthesis results that are similar or better than just using the unprocessed exemplar 130, while being several orders of magnitude faster.

Figure 2:
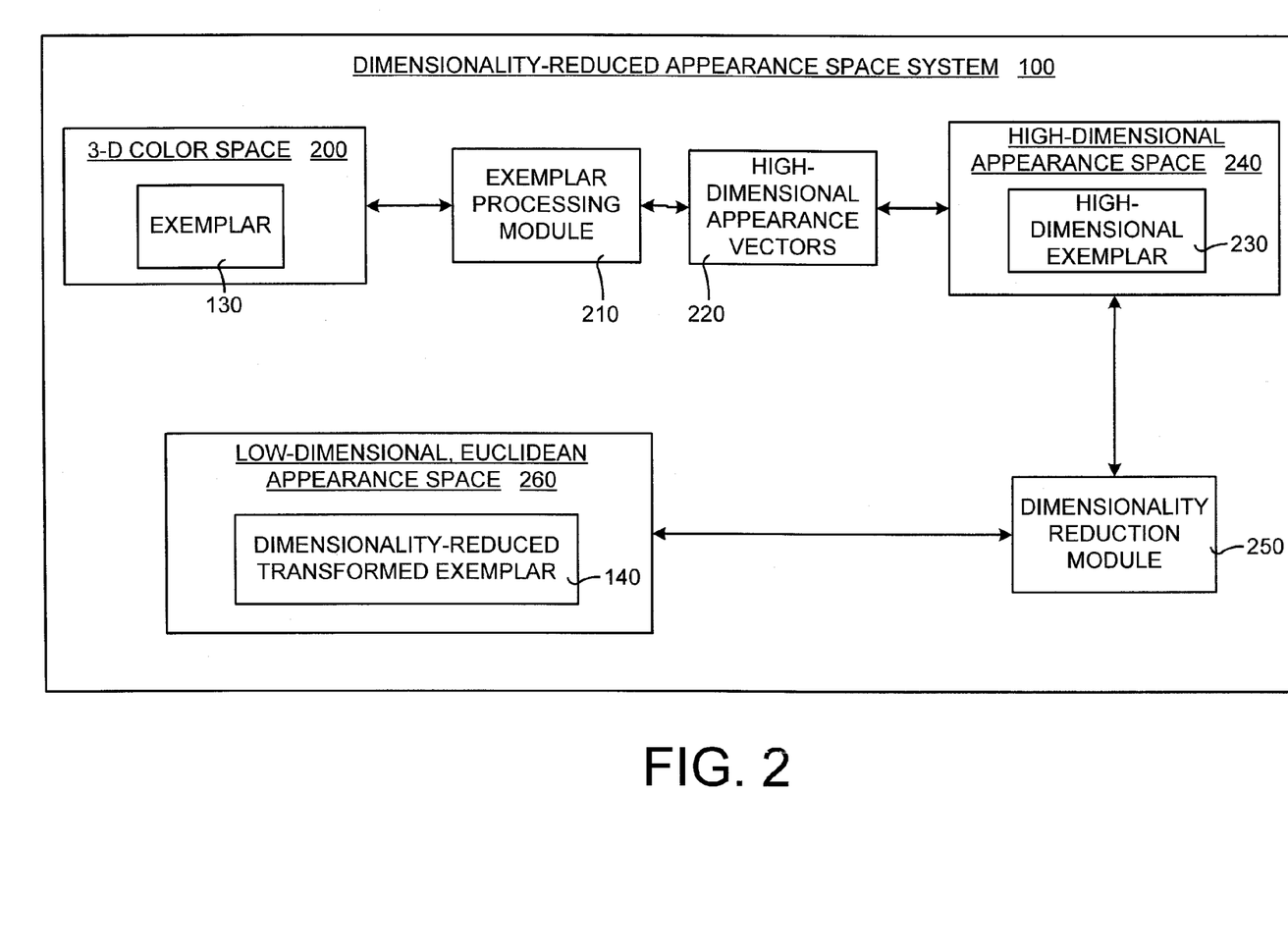
FIG. 2 is a block diagram illustrating the details of the dimensionality-reduced appearance space system shown in FIG. 1.

FIG. 2 is a block diagram illustrating the details of the dimensionality-reduced appearance space system 100 shown in FIG. 1. It should be noted that the dimensionality-reduced appearance space system 100 contains computer-executable instructions, such as program modules, that can be executed by the computing device 110. These program modules may include routines, programs, objects, components, data structures, and so forth, which perform particular tasks.

In general, the dimensionality-reduced appearance space system 100 processes the exemplar 130 to transform the exemplar 130 into the dimensionality-reduced transformed exemplar 140. Specifically, as shown in FIG. 2, the exemplar 130 is originally in three-dimensional (3-D) color space. This means that each pixel in the exemplar 130 has three associated color values, namely, red, green, and blue (RGB). Thus, each exemplar pixel can be thought of as having an associated 3-D vector containing RGB color values.

The dimensionality-reduced appearance space system 100 also includes an exemplar processing module 210. The exemplar processing module 210 processes the exemplar 130 to generate high-dimensional appearance vectors 220. These high-dimensional appearance vectors 220 are generate in part by using the 3-D RGB vector for each exemplar pixel. By "high-dimensional", it is meant that the high-dimensional appearance vectors 220 have greater dimensions than the 3-D RGB vector, or greater than three dimensions. As explained in detail below, the number of dimensions of each high-dimensional appearance vector 220 typically is one to three orders of magnitude greater than three dimensions.

One purpose of generating the high-dimensional appearance vectors 220 is to provide more information about a given pixel than can be obtained from just the 3-D RGB vector. As explained in further detail below, this allows exemplar pixels to be distinguished from one another more easily than using just the 3-D RGB vector. This provides greater texture synthesis quality.

The high-dimensional appearance vectors 220 are used to create a high-dimensional exemplar 230. The high-dimensional exemplar 230 is in a high-dimensional appearance space 240. It should be noted that the number of dimensions of the high-dimensional appearance space 240 is equal to the number of dimensions of each of the high-dimensional appearance vectors 220.

Much of the information contained in the high-dimensional exemplar 230 is redundant. This means that the full dimensionality of the high-dimensional exemplar 230 is not needed. The dimensionality-reduced appearance space system 100 includes a dimensionality reduction module 250 that uses any one of a variety of techniques to reduce the number of dimensions of the high-dimensional appearance space 240.

The result is the dimensionality-reduced transformed exemplar 140 that is in a low-dimensional Euclidean appearance space 260. By "low-dimensional", it is meant that the number of dimensions of the low-dimensional Euclidean appearance space 260 is much less than the number of dimensions of the high-dimensional appearance space 240. Typically, the number of dimensions of the low-dimensional Euclidean appearance space 260 is on the order of the 3-D color space 200. In some embodiments, the number of dimensions of the low-dimensional Euclidean appearance space 260 is four dimensions. In alternate embodiments the number of dimensions of the low-dimensional Euclidean appearance space 260 is eight dimensions.

II. Operational Overview

Figure 3:
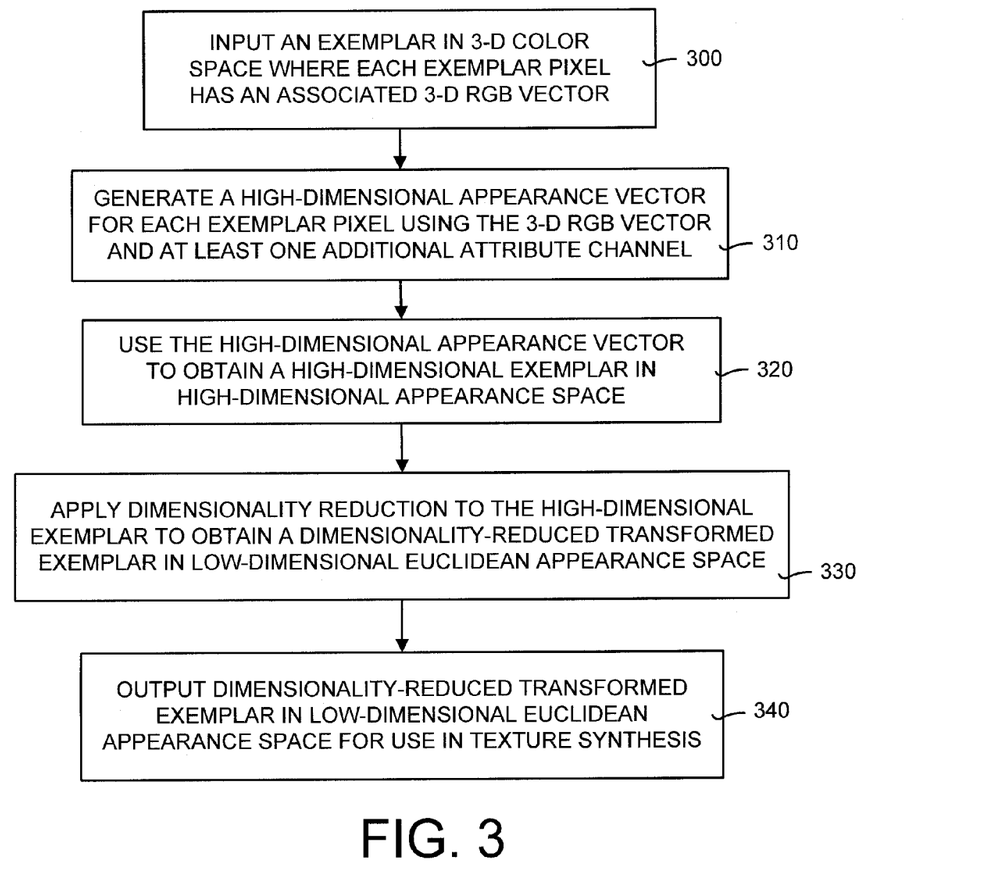
FIG. 3 is a flow diagram illustrating the general operation of the dimensionality-reduced appearance space method used in the dimensionality-reduced appearance space system shown in FIGS. 1 and 2.

FIG. 3 is a flow diagram illustrating the general operation of the dimensionality-reduced appearance space method used in the dimensionality-reduced appearance space system shown in FIGS. 1 and 2. In general, the dimensionality-reduced appearance space method transforms an exemplar image from the traditional space of pixel colors to a space of appearance vectors. Texture synthesis then can be performed in this transformed space.

In particular, referring to FIG. 3, the dimensionality-reduced appearance space method begins by inputting an exemplar in 3-D color space (box 300). Each exemplar pixel has an associated 3-D RGB vector containing RGB color values. Next, a high-dimensional appearance vector is generated for each exemplar pixel (box 310). This generation uses information from the 3-D RGB vector plus additional information intended to make it easy to distinguish between exemplar pixels.

The additional information is employed using additional attribute channels. At least one additional attribute channel is used, in addition to the information from the 3-D RGB vector. The appearance vector at a pixel should capture the local structure of the texture, such so that each pixel of the transformed exemplar provides an information-rich encoding for effective texture synthesis. The dimensionality-reduced appearance space method forms the appearance vector using additional attribute channels that include: (1) spatial neighborhood information, which encodes not just pointwise attributes but local spatial patterns including gradients; (2) feature information, which allows non-local information to be used to further distinguish pixels from each other; and (3) radiance transfer, which synthesizes material with consistent mesoscale self-shadowing properties. Each of these additional attribute channels is discussed in detail below.

The high-dimensional appearance vectors are used to obtain a high-dimensional exemplar in high-dimensional appearance space (box 320). Dimensionality reduction then is applied to the high-dimensional exemplar to obtain a dimensionality-reduced transformed exemplar (box 330). Importantly, this dimensionality-reduced transformed exemplar is in low-dimensional Euclidean appearance space. In Euclidean space, the distance between two different vectors in the space can be easily measured by summing the coordinate differences. This alleviates the need for matrix lookup or other complicated procedures to find distance.

The output of the dimensionality-reduced appearance space method is a dimensionality-reduced transformed exemplar in low-dimensional Euclidean appearance space (box 340). Texture synthesis then can be performed in this transformed space. Texture synthesis in this transformed space improves synthesis quality and enables new functionalities such as: (1) the ability to use smaller runtime neighborhood comparisons during synthesis; (2) anisometric synthesis, which creates a texture that is distorted according to a Jacobian field; (3) surface texture synthesis, which creates texture directly into the parametric domain of a parameterized surface (5) texture synthesis over an arbitrary surface, which creates texture directly into the parametric domain of a parameterized surface, and cancels distortions and discontinuities of the parameterization mapping; (4) texture advection of synthesized content, following a simulated or user-painted vector field; and (5) texture synthesis following a user-painted directional field, such that the synthesized texture features are oriented with respect to the user-painted direction field.

III. Operational Details

The details of the dimensionality-reduced appearance space method will now be discussed. The definition of the appearance vector will first be discussed in terms of the attribute channels that can be used. These attribute channels include the spatial neighborhood, feature distance, and radiance transfer. Finally, some of the possible dimensionality reduction techniques that may be used with the dimensionality-reduced appearance space method will be discussed.

Spatial Pixel Neighborhood

A traditional exemplar uses color at the pixel to distinguish itself from other exemplar pixels. In other words, the RGB color values of the exemplar pixel are used. However, if, for example, there are two adjacent white pixels that have the same or similar RGB color values, it can be difficult to distinguish between the two pixels. In this situation additional information is needed.

The dimensionality-reduced appearance space method includes encoding a spatial neighborhood of each pixel in one or more supplemental attribute channels to supply this additional information. The spatial neighborhood is the neighborhood surrounding a pixel. An appearance vector is generated that includes not only the RGB color values for the pixel, but also the RGB color values of the neighborhood pixels surrounding the pixel. Thus, even though the two adjacent white pixels have similar color values, they may have different neighborhoods, thereby distinguishing them from each other.

A spatial neighborhood can consist of adjacent pixels, where the pixel being processed typically is at the center. For example, in some embodiments the size of the spatial neighborhood is a 5×5 pixel neighborhood. In this case, the pixel being processed would have an associated 75-dimension appearance vector. This is because there are 25 pixels in the 5×5 pixels neighborhood, with each pixel containing 3 coefficients (RGB color values), with a total of 75 coefficients in the 5×5 neighborhood. In other embodiments, a 3×3 or 7×7 pixel neighborhood may be used. In still other embodiments, the different pixels in the neighborhood are weighted differently depending on their distance to a center pixel. For instance, in some embodiments, this approach diminishes the influence of distant pixels by applying a Gaussian weighting function.

Figure 4:
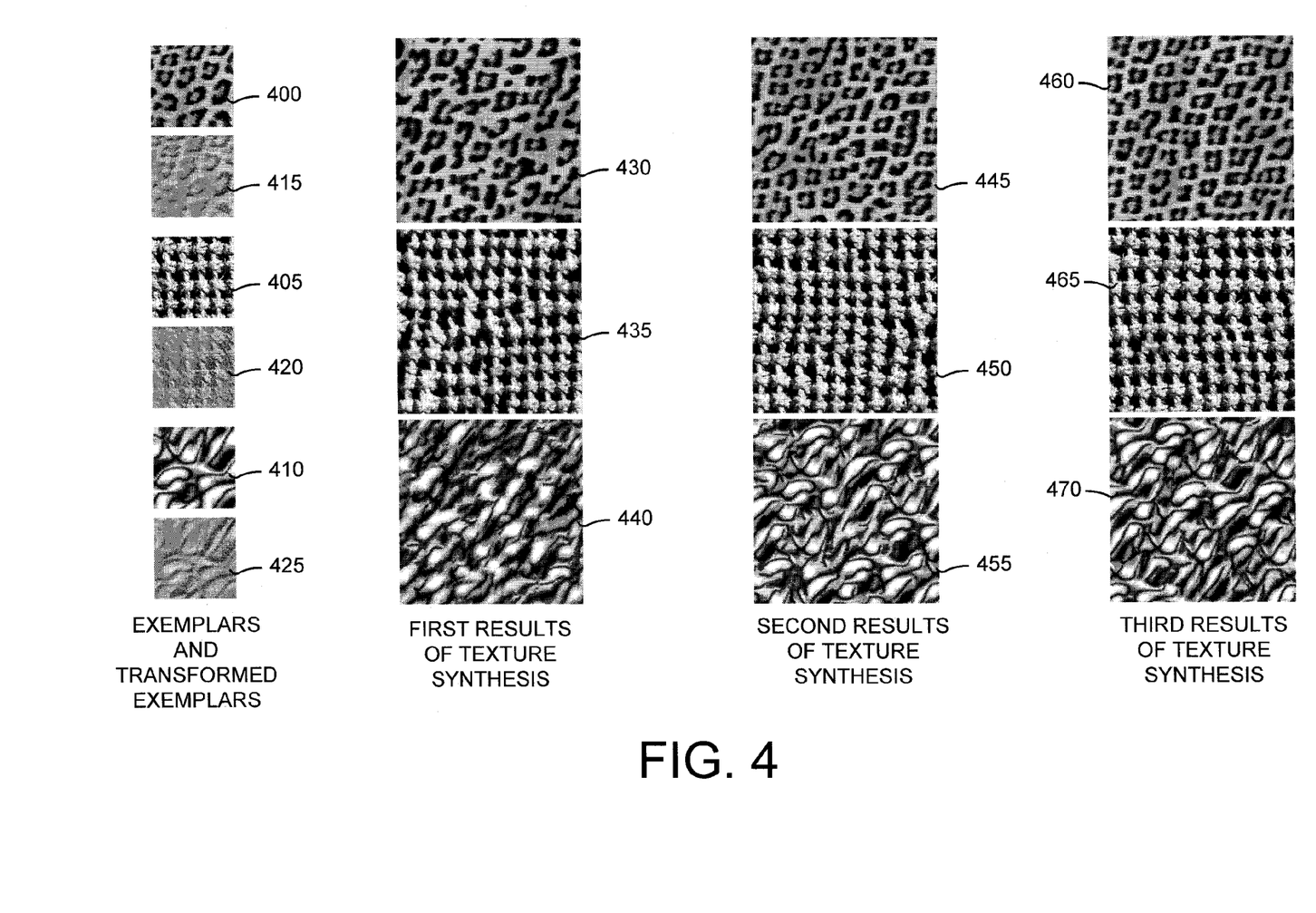
FIG. 4 illustrates the benefit of encoding a spatial neighborhood of each pixel in one or more additional attribute channels.

FIG. 4 illustrates the benefit of encoding a spatial neighborhood of each pixel in one or more additional attribute channels. In the far left column are the original exemplars 400, 405, 410, and the 3-D transformed exemplars 415, 420, 425. It should be noted that here the 3-D refers to the 3 attribute channels of a dimensionality-reduced appearance-space exemplar. Moreover, it should be noted that in other embodiments the transformed exemplar is a 4-D transformed exemplar and in still other embodiments the transformed exemplar is an 8-D transformed exemplar. The second column from the left is first results of texture synthesis 430, 435, 440. These first results shown are using the original exemplars 400, 405, 410. The third column from the left is the second results of texture synthesis 445, 450, 455. These second results are after texture synthesis using the 3-D transformed exemplars 415, 420, 425. It should be noted that the first results of texture synthesis 430, 435, 440 and the second results of texture synthesis 445, 450, 455 both operate on 3-D exemplars, and hence have the same synthesis cost. The far right column is the third results of texture synthesis 460, 465, 470. These results are after texture synthesis using the 8-D transformed exemplar (not shown). It can be seen that synthesis quality is improved using the transformed exemplars generated using the dimensionality-reduced appearance space method.

Feature Distance

Encoding a spatial neighborhood of each pixel in one or more additional attribute channels allows greater differentiation between example pixels. However, there are some times in texture analysis when it is desirable to go beyond the relatively small spatial pixel neighborhood and obtain a more non-local structure. Small spatial neighborhoods cannot encode large texture features. More importantly, simple color differences often fail to recognize semantic structure (such as mortar between non-homogeneous stones). To overcome this problem, feature distance information also can be encoded in one or more additional attribute channels.

The first step of using feature distance is to identify features. The dimensionality-reduced appearance space method uses a feature mask for this purpose. Given an original exemplar texture, either a user is asked or the system automatically extracts features, which produces a feature mask in the form of a binary image. In some embodiments, either white or black pixels represent boundaries of a feature. In other embodiments, the mask "colors" an entire feature rather than its boundary. For example, in an exemplar image having stones and mortar, the mask might color all stone pixels with white, and all mortar pixels with black. In other embodiments, more than two colors could be used. Given the feature mask, an assigned (or feature) distance image is created. Values are stored that represent the distance toward the nearest feature.

The feature mask image is a binary image that records either 0 or 1 (either a feature or not). The feature distance image is for every pixel, and gives the distance to the nearest feature. In some embodiments, this distance is a signed distance. By way of example, for stone pixels, a positive distance can be stored that represents the distance to the nearest mortar pixel. Also, for a mortar pixel, a negative distance can be stored that represents the distance to the nearest stone pixel. The combination of these positive and negative distances forms a continuous ramp scalar function across the boundary between features. Even though a pixel may not be at a feature, the distance to the nearest feature is known. In this manner, non-local information is used in the appearance vector to further differentiate pixels from each other. It should be noted that this signed distance data is considered over an entire pixel neighborhood, and thus contributes information that is encoded into the one or more additional attribute channels. For example, if a 5×5 pixel neighborhood is considered, the signed distance data contributes 5×5×1=25 additional attribute channels.

In some embodiments, the feature distance is used as an attribute channel along with the spatial pixel neighborhood information. Thus, for a 5×5 pixel neighbor hood, the new appearance vector has 5×5×4=100 dimensions. However, the appearance vector is still dimensionality reduced into the same number of dimensions as when encoding only spatial neighborhood of each pixel in one or more additional attribute channels.

However, some exemplars do not have significant features, and thus it probably is not worth creating a feature mask and building a feature distance image in these cases. Thus, in other embodiments, the feature distance information is not encoded in the one or more additional attribute channels In still other embodiments, the feature distance information is always encoded in the one or more additional attribute channels, such that if the exemplar has no feature a feature mask is created having no features. In this case, the feature distance would everywhere be zero.

Figure 5:
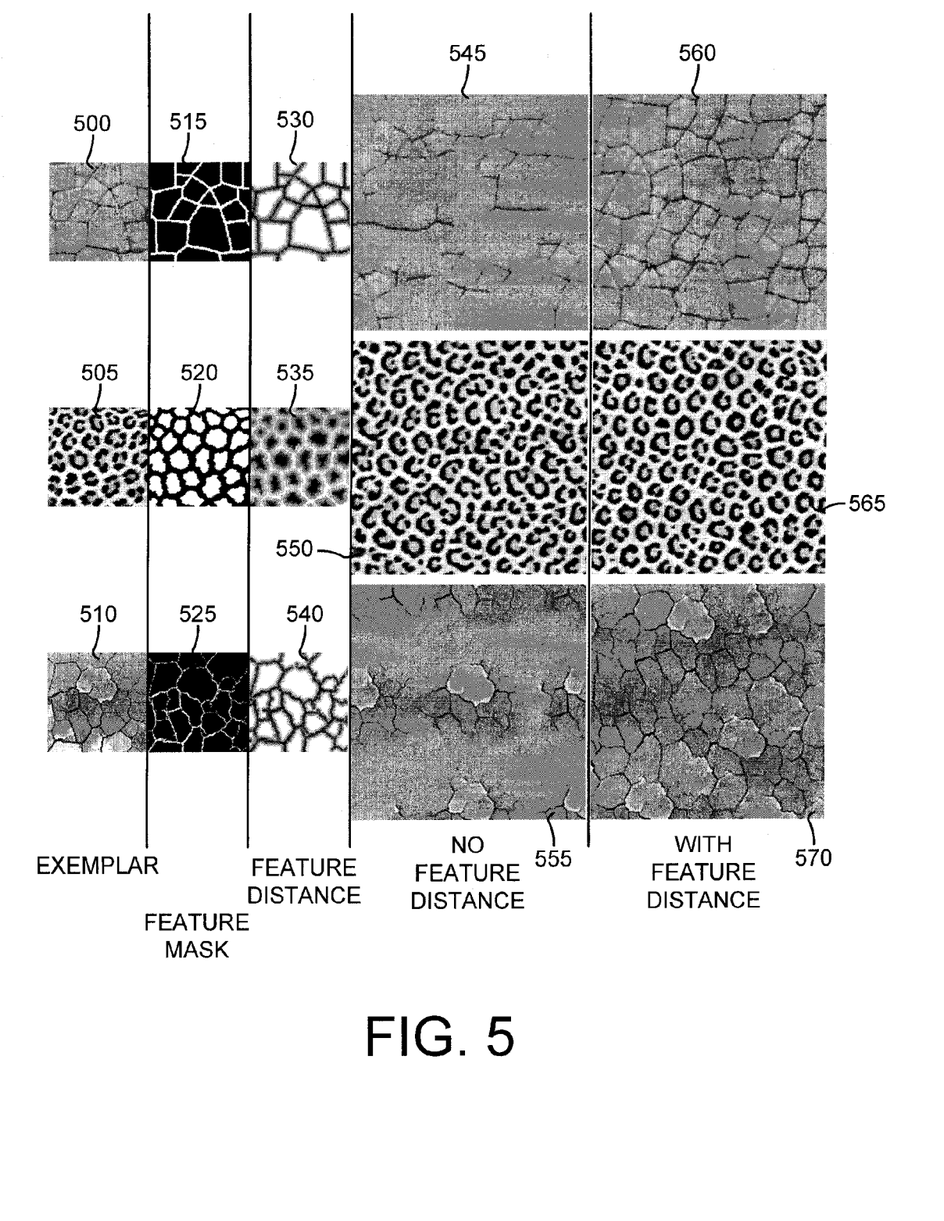
FIG. 5 illustrates the benefit of encoding feature distance information in one or more additional attribute channels.

FIG. 5 illustrates the benefit of encoding feature distance information in one or more additional attribute channels. In the far left column of FIG. 5, the original exemplar image is shown 500, 505, 510. In the second column from the left, the feature mask is shown 515, 520, 525. The feature masks are provided either by a user or automatically by the system. The third column from the left illustrates the feature distance maps 530, 535, 540, associated with each of the feature masks 515, 520, 525.

In the column second from the right, the results of texture synthesis without feature distance are shown 545, 550, 555. For comparison purposes, the far right column illustrates the results of texture synthesis using the feature distance as an attribute channel 560, 565, 570. It can be seen from FIG. 5 that the use of feature distance as an attribute channel, at least in certain circumstances, can lead to a marked improvement in texture synthesis quality.

Figure 6:
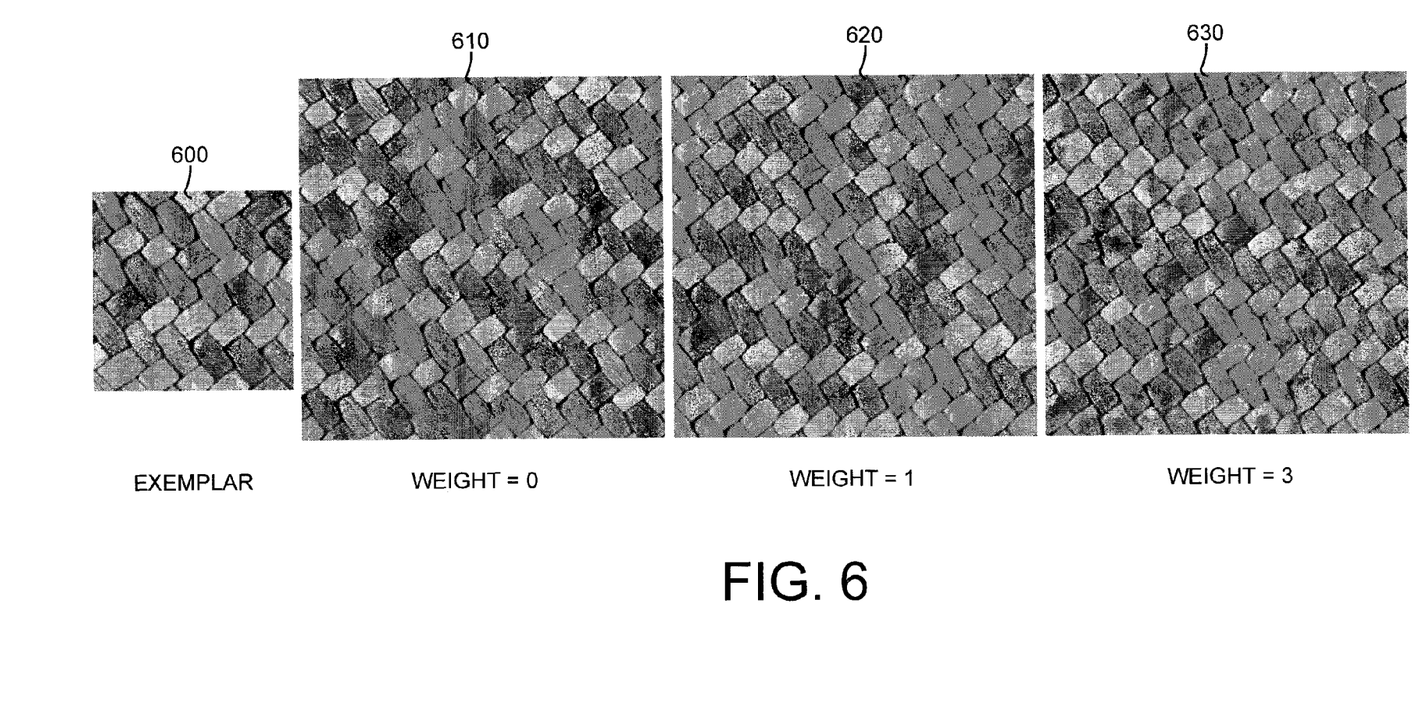
FIG. 6 illustrates the effect of feature channel weight on synthesis quality.

In some embodiments, a weight, w, may be used to weight the influence of the feature distance attribute channel in the appearance vector. In these embodiments, a weight of w=0 results in no contribution from the feature distance attribute channel, while progressively larger weights lead to more contribution. FIG. 6 illustrates the effect of feature channel weight on synthesis quality. Texture synthesis is performed using an exemplar 600. Results are shown for a weight of zero (w=0) 610, a weight of 1 (w=1) 620, and a weight of 3 (w=3) 630. It can be seen from FIG. 6, that the texture synthesis performed using a weight of 1 (w=1) 620 yields the best results. The tradeoff is that a larger weight w downplays color differences, and this eventually results in synthesis noise.

Radiance Transfer

The idea of exemplar transformation applies to spaces other than just color spaces. For example, in some embodiments the dimensionality-reduced appearance space method is applied to a 36-dimensional (36-D) space. In these embodiments, radiance transfer information is encoded in the one or more additional attribute channels to include an exemplar under a variety of lighting conditions. Radiance transfer is not a technique for improving the synthesis of color textures. Rather, the dimensionality-reduced appearance space method can be applied to a different (and more difficult) problem of synthesizing a Radiance Transfer Textures (RTT). In this case, the input to the dimensionality-reduced appearance space method is not just a 3D color texture, but an RTT.

Radiance transfer examines the exemplar pixels under various lighting environments. Rather than just capturing the color of the texture from one viewing direction and one light direction, additional information about a pixel is obtained by moving a light source and viewing the texture of the exemplar under various lighting environments. For example, if a piece of material has bumps, it will look different under different lighting conditions, due to effects like self-shadowing.

The RTT technique encodes information about how a material at one pixel will respond to different lighting environments. RTT uses a simulation process. In particular, a material is specified as a height field (or elevation map), then a simulation called "ray tracing" is run, whereby rays are cast in different directions. Through this process, enough information can be recorded at every pixel such that the image can be reshaded using a different lighting environments. Thus, the RTT technique is a way of encoding, within one image, a whole series of responses of the material to different lighting environments.

The result of using the RTT technique is that at every pixel the RTT texture has 36-D vector, meaning that it has 36 coefficients. This can vary depending on the accuracy desired. The exemplar is not a color image, but rather is an RTT image, where every pixel has, rather than 3-D, has 36-D. In some embodiments the RTT technique is used as an attribute channel along with the spatial pixel neighborhood. In this case, if a 5×5 pixel neighborhood is used, the appearance vector is a 900-D vector. As before, dimensionality reduction to reduce the 900-D vector to low-dimensional Euclidean spaced, such as an 8-D vector space. It should be noted that even with a reduction from 900-D to 8-D, the resulting 8-D transformed exemplar provides a basis for very effective textures synthesis.

The RTT technique is one type of radiance transfer representation. In other embodiments, a technique called a bidirectional texture function (BTF) technique is used. The BTF technique represents reflectance using directional bases for both view and light, and is therefore ideal for point light sources. So these are two separate representations for encoding the look of the material under different lighting environments.

In some embodiments, feature distance information also can be encoded in the one or more additional attribute channels along with radiance transfer information. However, because the self-shadowing information of the RTT technique already captures non-local information, the need for encoding the feature distance information in the one or more additional attribute channels along with the radiance transfer information is reduced. Thus, in other embodiments only the spatial pixel neighborhood information and radiance transfer information are encoded in the one or more additional attribute channels.

Figure 7:
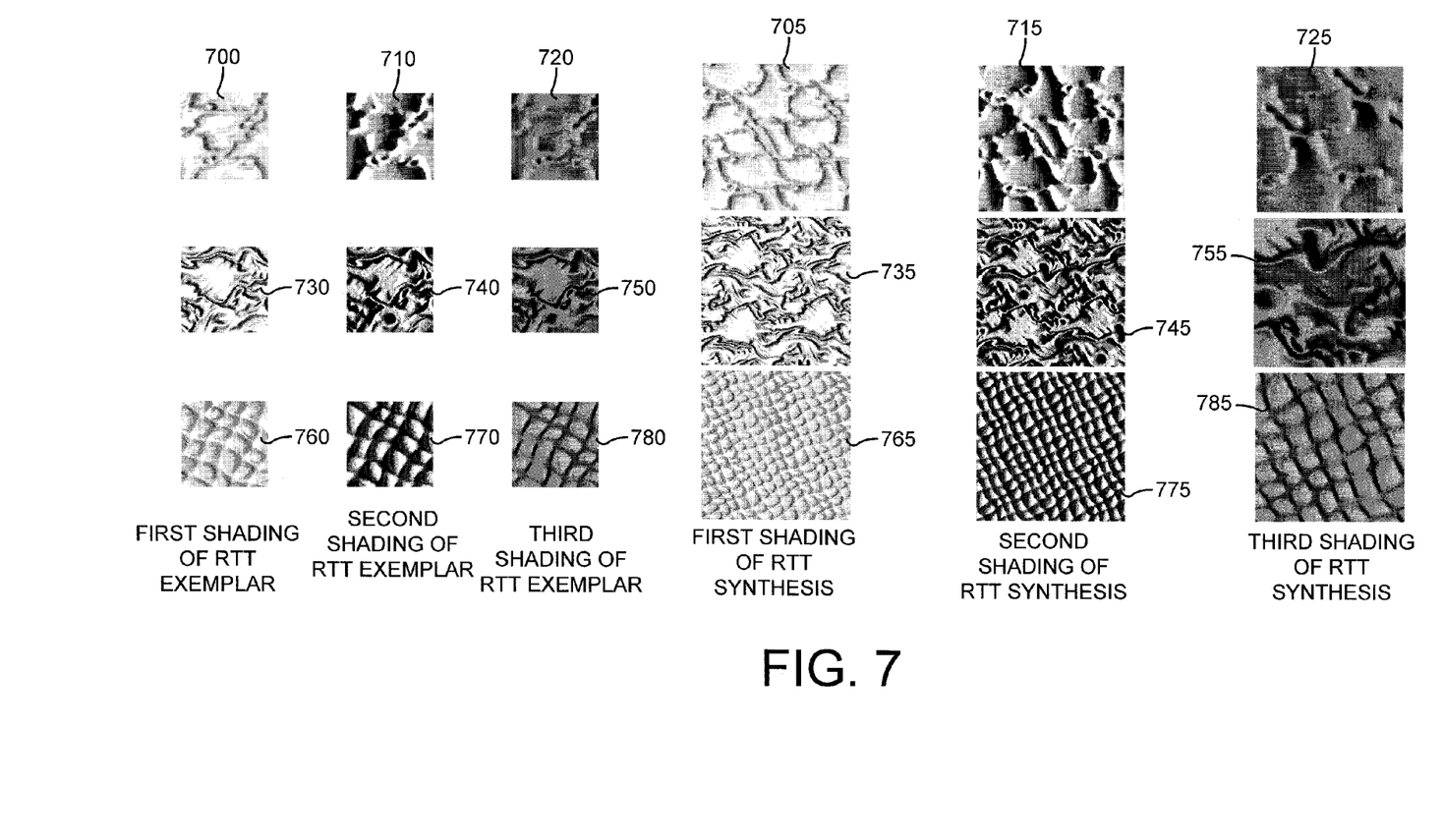
FIG. 7 illustrates the benefit of encoding radiance transfer information in one or more additional attribute channels.

FIG. 7 illustrates the benefit of encoding radiance transfer information in one or more additional attribute channels. In particular, each of the three far left columns illustrates three different shadings of a 36-dimensional (36-D) RTT exemplar. The three far right columns illustrate the results of texture synthesis using each of these three shadings. Texture synthesis is performed using this 36-D RTT exemplar as input to create a 36-D synthesized RTT. The three far right columns illustrate shadings of the synthesized RTTs using the same lighting environments as the three far left columns, respectively.

Referring to FIG. 7, a first exemplar is shown under a first shading 700, with its resulting texture synthesis 705, a second shading 710 with its resulting texture synthesis 715, and a third shading 720, with its resulting texture synthesis 725. Similarly, a second exemplar is shown under a first shading 730, with its resulting texture synthesis 735, a second shading 740 with its resulting texture synthesis 745, and a third shading 750, with its resulting texture synthesis 755. Also shown in FIG. 7, in the bottom row, is a third exemplar under a first shading 760, with its resulting texture synthesis 765, a second shading 770 with its resulting texture synthesis 775, and a third shading 780, with its resulting texture synthesis 785.

Types of Dimensionality Reduction

The dimensionality-reduced appearance space method can use various techniques to perform dimensionality reduction. Each one of these techniques preprocesses a given exemplar into a dimensionally-reduced Euclidean space. Various dimensionality reduction techniques that may be used with the dimensionality-reduced appearance space method now will be mentioned. It should be noted that these techniques are well known in the art, and will not be discussed in detail.

In some embodiments, linear dimensionality reduction techniques are used. One such linear technique is principal component analysis (PCA). In general, PCA find the most significant n number of dimensions of the initial high-dimensional appearance space, where n is the number of dimensions desired for the low-dimensional Euclidean appearance space. After PCA, there is no longer redundancy of information associated with the high-dimensional appearance space. Instead, only crucial information remains, or the essence of what differentiates one exemplar pixel from another. Thus, PCA find the most significant dimensions from the high-dimensional appearance space that best distinguish pixels from one another.

Because the dimensionality-reduced appearance space method performs exemplar transformation as a preprocess prior to runtime, in some embodiments linear dimensionality reduction (such as PCA) can be replaced by nonlinear dimensionality reduction techniques without affecting the performance of runtime texture synthesis. In some embodiments, the nonlinear dimensionality reduction technique is a multi-dimensional scaling (MDS) technique. In other embodiments, the nonlinear technique used is an isomap technique, which builds on the MDS technique. Still other embodiments use a locally linear embedding (LLE) technique. All of these techniques are nonlinear.

Both isomaps and LLE aim to parameterize the data over a nonlinear manifold. They approximate the local structure of this manifold by building a weighted graph on the points using either a global distance threshold or k-nearest neighborhoods. This graph construction, however, can be challenging to implement. One problem is that distance thresholds become unstable in high-dimensional spaces due to low variance in distances. Moreover, k-neighborhoods behave poorly due to the presence of dense degenerate clusters. Therefore, in the embodiments using nonlinear dimensionality reduction, fine clustering is performed as a preprocess to collapse degenerate clusters, prior to constructing a k=70 neighborhood graph on this regularized data.

Figure 8:
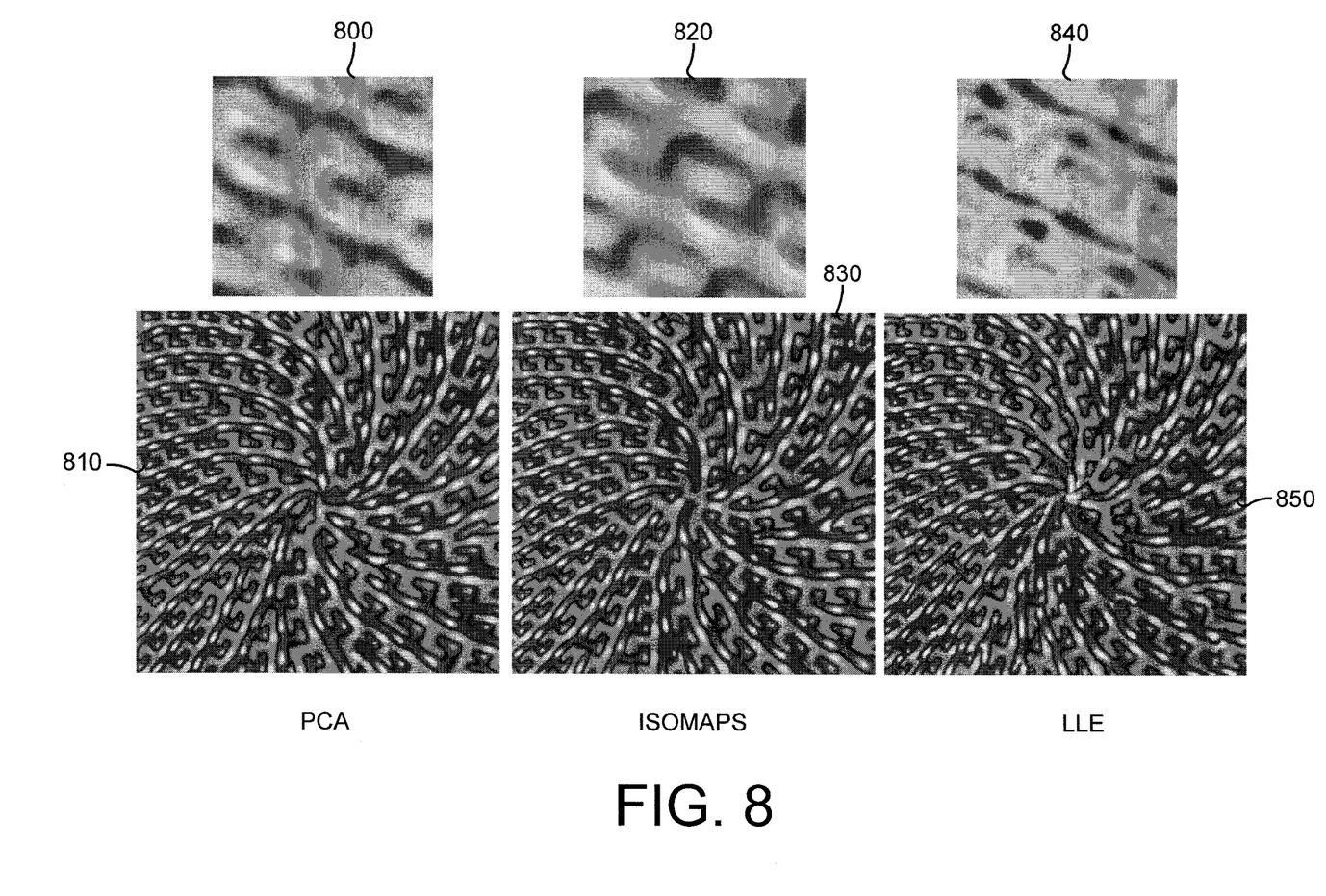
FIG. 8 illustrates a comparison of three different dimensionality reduction techniques on synthesis quality.

FIG. 8 illustrates a comparison of three different dimensionality reduction techniques on synthesis quality. Specifically, the dimensionality-reduced appearance space method was used to transform exemplars in to four-dimensional (4-D) Euclidean appearance space. The dimensionality reduction was performed using PCA, isomaps, and LLE techniques.

Referring to FIG. 8, a first transformed exemplar 800 was reduced to 4-D Euclidean appearance space using the PCA technique. This first transformed exemplar 800 was used to synthesize a first texture 810. Similarly, a second transformed exemplar 820 was reduced to 4-D Euclidean appearance space using the isomaps technique. This second transformed exemplar 820 was used to synthesize a second texture 830. Finally, a third transformed exemplar 840 was reduced to 4-D Euclidean appearance space using the LLE technique. This third transformed exemplar 840 was used to synthesize a third texture 850.

As can be seen from FIG. 8, using the linear PCA technique for dimensionality reduction leads to comparable texture synthesis results of the best nonlinear techniques. For the nonlinear techniques, using the isomaps technique leads to better texture synthesis results than the LLE technique. One explanation is that isomaps are less likely to map dissimilar neighborhoods to nearby points in the transformed exemplar space, because they preserve geodesic distances between all pairs of points. On the other hand, the LLE technique preserves the geometry of local neighborhoods.

IV. Exemplary Operating Environment

The dimensionality-reduced appearance space system and method is designed to operate in a computing environment. The following discussion is intended to provide a brief, general description of a suitable computing environment in which the dimensionality-reduced appearance space system and method may be implemented.

Figure 9:
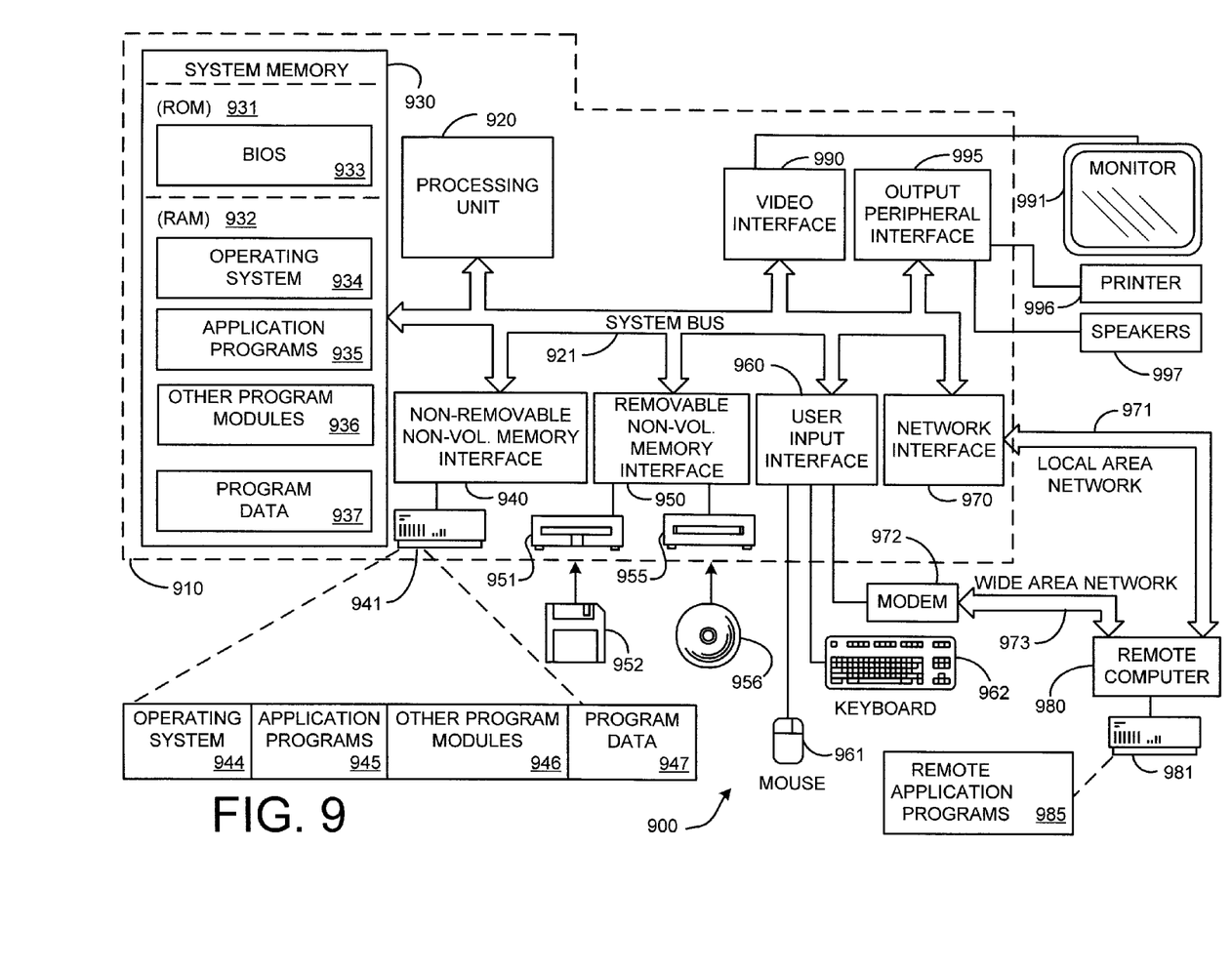
FIG. 9 illustrates an example of a suitable computing system environment in which the dimensionality-reduced appearance space system and method may be implemented.

FIG. 9 illustrates an example of a suitable computing system environment in which the dimensionality-reduced appearance space system and method may be implemented. The computing system environment 900 is only one example of a suitable computing environment and is not intended to suggest any limitation as to the scope of use or functionality of the invention. Neither should the computing environment 900 be interpreted as having any dependency or requirement relating to any one or combination of components illustrated in the exemplary operating environment.

The dimensionality-reduced appearance space system and method is operational with numerous other general purpose or special purpose computing system environments or configurations. Examples of well known computing systems, environments, and/or configurations that may be suitable for use with the dimensionality-reduced appearance space system and method include, but are not limited to, personal computers, server computers, hand-held, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

The dimensionality-reduced appearance space system and method may be described in the general context of computer-executable instructions, such as program modules, being executed by a computer. Generally, program modules include routines, programs, objects, components, data structures, etc., that perform particular tasks or implement particular abstract data types. The dimensionality-reduced appearance space system and method may also be practiced in distributed computing environments where tasks are performed by remote processing devices that are linked through a communications network. In a distributed computing environment, program modules may be located in both local and remote computer storage media including memory storage devices. With reference to FIG. 9, an exemplary system for the dimensionality-reduced appearance space system and method includes a general-purpose computing device in the form of a computer 910.

Components of the computer 910 may include, but are not limited to, a processing unit 920 (such as a central processing unit, CPU), a system memory 930, and a system bus 921 that couples various system components including the system memory to the processing unit 920. The system bus 921 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 910 typically includes a variety of computer readable media. Computer readable media can be any available media that can be accessed by the computer 910 and includes both volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules or other data.

Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 910. Communication media typically embodies computer readable instructions, data structures, program modules or other data in a modulated data signal such as a carrier wave or other transport mechanism and includes any information delivery media.

Note that the term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 930 includes computer storage media in the form of volatile and/or nonvolatile memory such as read only memory (ROM) 931 and random access memory (RAM) 932. A basic input/output system 933 (BIOS), containing the basic routines that help to transfer information between elements within the computer 910, such as during start-up, is typically stored in ROM 931. RAM 932 typically contains data and/or program modules that are immediately accessible to and/or presently being operated on by processing unit 920. By way of example, and not limitation, FIG. 9 illustrates operating system 934, application programs 935, other program modules 936, and program data 937.

The computer 910 may also include other removable/non-removable, volatile/nonvolatile computer storage media. By way of example only, FIG. 9 illustrates a hard disk drive 941 that reads from or writes to non-removable, nonvolatile magnetic media, a magnetic disk drive 951 that reads from or writes to a removable, nonvolatile magnetic disk 952, and an optical disk drive 955 that reads from or writes to a removable, nonvolatile optical disk 956 such as a CD ROM or other optical media.

Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 941 is typically connected to the system bus 921 through a non-removable memory interface such as interface 940, and magnetic disk drive 951 and optical disk drive 955 are typically connected to the system bus 921 by a removable memory interface, such as interface 950.

The drives and their associated computer storage media discussed above and illustrated in FIG. 9, provide storage of computer readable instructions, data structures, program modules and other data for the computer 910. In FIG. 9, for example, hard disk drive 941 is illustrated as storing operating system 944, application programs 945, other program modules 946, and program data 947. Note that these components can either be the same as or different from operating system 934, application programs 935, other program modules 936, and program data 937. Operating system 944, application programs 945, other program modules 946, and program data 947 are given different numbers here to illustrate that, at a minimum, they are different copies. A user may enter commands and information into the computer 910 through input devices such as a keyboard 962 and pointing device 961, commonly referred to as a mouse, trackball or touch pad.

Other input devices (not shown) may include a microphone, joystick, game pad, satellite dish, scanner, radio receiver, or a television or broadcast video receiver, or the like. These and other input devices are often connected to the processing unit 920 through a user input interface 960 that is coupled to the system bus 921, but may be connected by other interface and bus structures, such as, for example, a parallel port, game port or a universal serial bus (USB). A monitor 991 or other type of display device is also connected to the system bus 921 via an interface, such as a video interface 990. In addition to the monitor, computers may also include other peripheral output devices such as speakers 997 and printer 996, which may be connected through an output peripheral interface 995.

The computer 910 may operate in a networked environment using logical connections to one or more remote computers, such as a remote computer 980. The remote computer 980 may be a personal computer, a server, a router, a network PC, a peer device or other common network node, and typically includes many or all of the elements described above relative to the computer 910, although only a memory storage device 981 has been illustrated in FIG. 9. The logical connections depicted in FIG. 9 include a local area network (LAN) 971 and a wide area network (WAN) 973, but may also include other networks. Such networking environments are commonplace in offices, enterprise-wide computer networks, intranets and the Internet.

When used in a LAN networking environment, the computer 910 is connected to the LAN 971 through a network interface or adapter 970. When used in a WAN networking environment, the computer 910 typically includes a modem 972 or other means for establishing communications over the WAN 973, such as the Internet. The modem 972, which may be internal or external, may be connected to the system bus 921 via the user input interface 960, or other appropriate mechanism. In a networked environment, program modules depicted relative to the computer 910, or portions thereof, may be stored in the remote memory storage device. By way of example, and not limitation, FIG. 9 illustrates remote application programs 985 as residing on memory device 981. It will be appreciated that the network connections shown are exemplary and other means of establishing a communications link between the computers may be used.

The foregoing Detailed Description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A method for processing an exemplar prior to texture synthesis, comprising:
   using a computer to perform the following:
      defining a neighborhood of pixels in the exemplar, the neighborhood of pixels including a selected pixel at a center of the neighborhood of pixels;
      generating an appearance vector for the selected pixel by using information from pixels in the neighborhood of pixels that are in a spatial neighborhood immediately surrounding the selected pixel, the appearance vector in a first appearance space having a first number of dimensions;
      assigning weights to each pixel in the neighborhood of pixels other than the selected pixel such that a distance weight value of each pixel is dependent only on a distance from that pixel to the selected pixel; and
      applying dimensionality reduction to the appearance vector to produce a dimensionality-reduced transformed exemplar that is used as input to the texture synthesis, wherein the dimensionality-reduced transformed exemplar is in a second appearance space that is Euclidean and having a lower number of dimensions than the first appearance space.

2. The method of claim 1, further comprising generating the appearance vector by examining color information at the pixel in the exemplar and its neighborhood pixels adjacent to the pixel.

3. The method of claim 2, wherein the appearance vector is computed as a vector of the color values of the pixel and its neighborhood pixels.

4. The method of claim 3, wherein the texture synthesis is a multi-resolution texture synthesis having an exemplar for each resolution level, further comprising specializing the dimensionality reduction to each exemplar.

5. The method of claim 3, further comprising performing dimensionality reduction of the appearance vector using principal component analysis (PCA).

6. The method of claim 3, further comprising performing dimensionality reduction of the appearance vector using a nonlinear technique.

7. The method of claim 1, further comprising generating the appearance vector by encoding additional information in one or more additional attribute channels, wherein the additional information is in addition to red, green, and blue (RGB) color values of pixels.

8. The method of claim 7, further comprising encoding feature distance information in the one or more additional attribute channels.

9. The method of claim 8, further comprising using a feature mask to obtain the feature distance.

10. The method of claim 7, further comprising encoding lighting environment dependence information of the exemplar in the one or more additional attribute channels.

11. The method of claim 7, further comprising encoding view dependence information of the exemplar in the one or more additional attribute channels.

12. The method of claim 7, further comprising encoding foreground and background segmentation information of the exemplar in the one or more additional attribute channels.

13. A computer-readable storage medium having stored and encoded thereon computer-executable instructions for generating a transformed exemplar for texture synthesis, comprising:
 defining a neighborhood of pixels including a center pixel in the exemplar, each of the pixels having associated red, green, and blue (RGB) color values;
 assigning weights to each pixel in the neighborhood of pixels other than the center pixel such that a distance weight value of each pixel is dependent only on a distance from that pixel to the center pixel;
 forming a higher-dimensional appearance vector by combining the RGB color values of each of the pixels; and
 adding one or more attribute channels to the higher-dimensional appearance vector that includes encoded information derived from labeled features to further distinguish exemplar pixels from each other to generate the transformed exemplar;
 wherein the higher-dimensional appearance vector has a number of dimensions equal to at least four times a number of pixels in the neighborhood.

14. The computer-readable storage medium of claim 13, further comprising generating the transformed exemplar in Euclidean appearance space.

15. The computer-readable storage medium of claim 14, further comprising reducing the dimensionality of the higher-dimensional appearance vector using a linear technique.

16. The computer-readable storage medium of claim 15, wherein the dimensionality of the higher-dimensional appearance vector is equal to one of: (a) eight dimensions; (b) four dimensions.

17. A computer-implemented process for transforming an exemplar into a transformed appearance space prior to texture synthesis, comprising:
 using the computer to perform the following:
  selecting a pixel in the exemplar and a number of neighborhood pixels surrounding the selected pixel, wherein the selected pixel and the neighborhood pixels are in three-dimensional color space;
  assigning weights to each pixel in the neighborhood pixels other than the selected pixel such that a distance weight value of each pixel is dependent only on a distance from that pixel to the selected pixel;
  defining one or more additional attribute channels for at least one of: (a) the selected pixel; (b) the neighborhood pixels;
  encoding in the one or more additional attribute channels feature distance information that includes a distance from the selected pixel to a labeled feature that is located in the exemplar to generate a feature distance attribute channel;
  assigning a feature distance weight to the feature distance attribute channel to weight an influence of the feature distance attribute channel in a high-dimensional appearance vector such that a feature distance weight of zero results in no contribution from the feature distance attribute channel while progressively larger feature distance weights lead to more contribution from the feature distance attribute channel;
  forming the high-dimensional appearance vector associated with the selected pixel by directly using the red, green, and blue (RGB) color values of the selected pixel and neighborhood pixels and the one or more additional attribute channels such that the high-dimensional appearance vector has a first number of dimensions in a high-dimensional appearance space; and
  performing dimensionality reduction on the high-dimensional appearance vector to reduce a dimensionality of the high-dimensional appearance vector from the first number of dimensions to a second number of dimensions such that the selected pixel is transformed from the high-dimensional appearance space into a low-dimensional Euclidean space having a second number of dimensions;
  wherein the second number of dimensions is substantially less than the first number of dimensions.

18. The computer-implemented process of claim 17, further comprising performing dimensionality reduction using at least one of: (a) a principal component analysis (PCA) technique; (b) an isomaps technique; (c) a multi-dimensional scaling (MDS) technique; (d) a local linearly embedding (LLE) technique.

19. The computer-implemented process of claim 17 further comprising defining one or more additional attribute channels for the selected pixel that provides lighting environment dependence information about how the selected pixel appears under different lighting conditions using at least one of: (a) a radiance transfer textures (RTT) technique; (b) a bidirectional texture function (BTF) technique.

* * * * *